United States Patent
Kori et al.

(10) Patent No.: US 11,431,212 B2
(45) Date of Patent: Aug. 30, 2022

(54) METHOD OF MANUFACTURING ROTOR

(71) Applicant: AISIN CORPORATION, Kariya (JP)

(72) Inventors: Motoki Kori, Anjo (JP); Tetsuya Matsubara, Okazaki (JP); Yosuke Miyazaki, Anjo (JP); Taisuke Nakamura, Nishio (JP)

(73) Assignee: AISIN CORPORATION, Kariya (JP)

( * ) Notice: Subject to any disclaimer, the term of this patent is extended or adjusted under 35 U.S.C. 154(b) by 289 days.

(21) Appl. No.: 16/637,948

(22) PCT Filed: Sep. 28, 2018

(86) PCT No.: PCT/JP2018/036511
§ 371 (c)(1),
(2) Date: Feb. 10, 2020

(87) PCT Pub. No.: WO2019/066048
PCT Pub. Date: Apr. 4, 2019

(65) Prior Publication Data
US 2020/0212735 A1      Jul. 2, 2020

(30) Foreign Application Priority Data

Sep. 29, 2017 (JP) ................................ 2017-190893

(51) Int. Cl.
| | | |
|---|---|---|
| *H02K 15/02* | (2006.01) | |
| *H02K 1/276* | (2022.01) | |
| *H02K 1/28* | (2006.01) | |
| *H02K 15/03* | (2006.01) | |
| *H02K 15/12* | (2006.01) | |

(52) U.S. Cl.
CPC .............. *H02K 1/276* (2013.01); *H02K 1/28* (2013.01); *H02K 15/03* (2013.01); *H02K 15/12* (2013.01); *Y10T 29/49012* (2015.01)

(58) Field of Classification Search
CPC ......... Y10T 29/49012; Y10T 29/49009; Y10T 29/4902; H02K 15/0012; H02K 1/26; H02K 15/02
USPC ......... 29/598, 596, 602.1, 603.25, 604, 607, 29/729, 732
See application file for complete search history.

(56) References Cited

U.S. PATENT DOCUMENTS 8,698,371 B2 *   4/2014   Komada .................. H02K 1/28
                                                              310/216.004
10,418,886 B2 *  9/2019   Nagai .................... H02K 15/02

FOREIGN PATENT DOCUMENTS

JP     2007-151362 A    6/2007

OTHER PUBLICATIONS

Dec. 18, 2018 International Search Report issued in International Patent Application No. PCT/JP2018/036511.

* cited by examiner

*Primary Examiner* — Thiem D Phan
(74) *Attorney, Agent, or Firm* — Oliff PLC

(57) ABSTRACT

A method of manufacturing a rotor including a rotor core and a permanent magnet that is bonded to the rotor core with an adhesive containing a foaming agent, wherein applying the adhesive includes applying the adhesive such that the adhesive is spread to a portion on a front side with respect to the application area on the application surface, by moving the nozzle to a front side in the nozzle traveling direction with respect to a position in the application area at which feeding of the adhesive by the pump is finished.

12 Claims, 9 Drawing Sheets

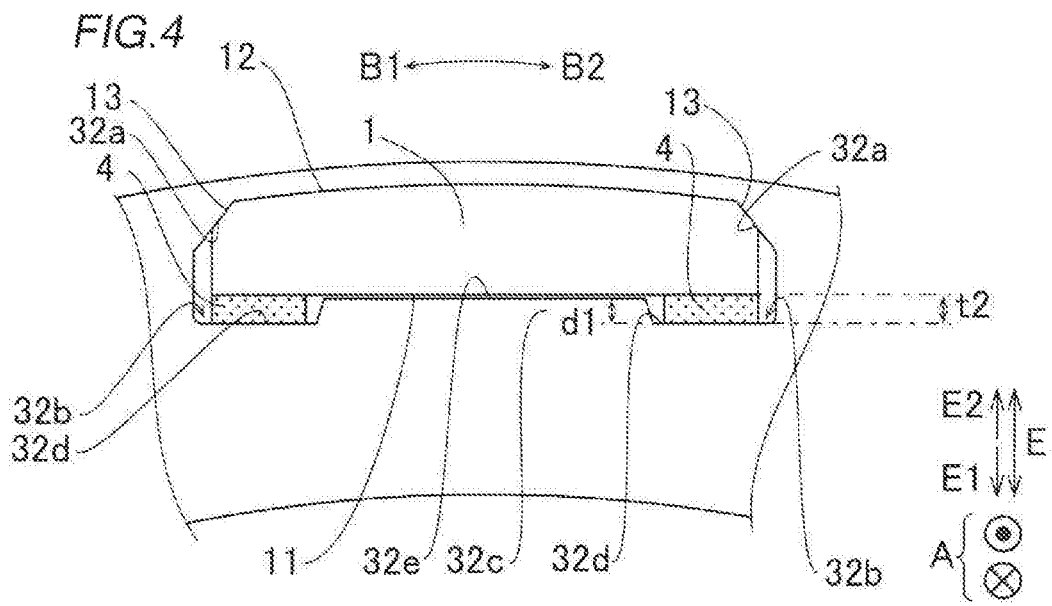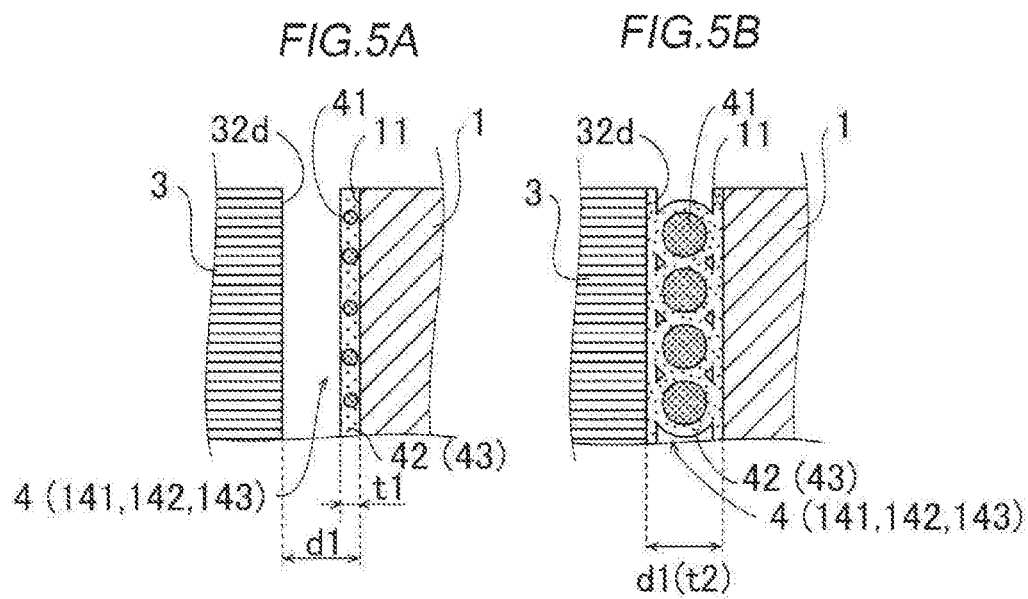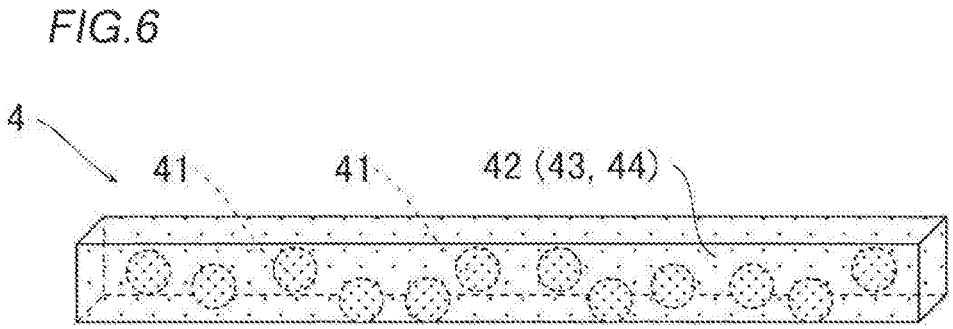

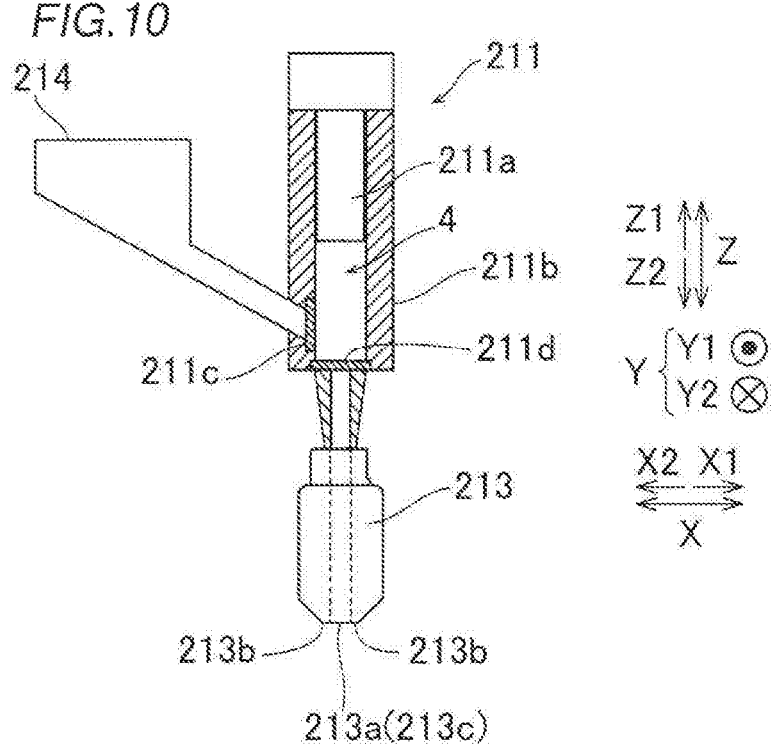
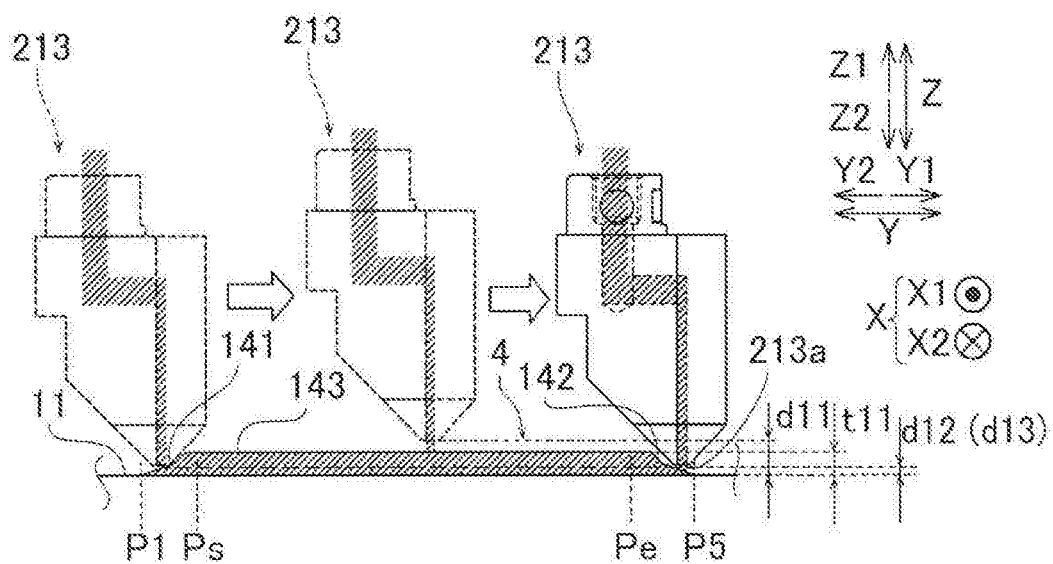

METHOD OF MANUFACTURING ROTOR

BACKGROUND

The present disclosure relates to a method of manufacturing a rotor, and an application device.

A method of manufacturing a rotor in which permanent magnets are bonded to a rotor core with an adhesive containing a foaming agent, and an application device have been known. This type of rotor manufacturing method and application device are disclosed in, for example, Japanese Patent Application Publication No. 2007-151362 (JP 2007-151362 A).

JP 2007-151362 A discloses a rotor manufacturing method that dispenses droplets of molten adhesive containing a foaming agent onto the surface of a permanent magnet by using a dispenser (application device). According to this rotor manufacturing method, the adhesive dispensed on the surface of the permanent magnet is pressed by a press machine having a heater. With a pressing force by the pressing operation, the adhesive is formed into a sheet shape. Then, the permanent magnet is placed into an accommodating groove in a rotor core. After that, the adhesive is heated to foam and cure, so that the permanent magnet is fixed to the accommodating groove.

SUMMARY

However, according to Japanese Patent Application Publication No. 2007-151362 JP 2007-151362 A, since the adhesive dispensed by the dispenser is formed into a sheet shape by the press machine, the dispenser (application device) and the press machine are needed. This is disadvantageous as the size of rotor manufacturing equipment is increased.

To prevent an increase in the size of rotor manufacturing equipment, an adhesive may be applied to the surface (application surface) of a permanent magnet so as to have a uniform thickness (sheet shape) by an application device, without using a press machine. For example, an adhesive may be applied to an application surface by discharging an adhesive from a nozzle of an application device while moving the nozzle relative to the application surface.

However, the inventors of the present disclosure found that even when an attempt is made to apply an adhesive with a uniform thickness by discharging the adhesive within an application area on the application surface with a constant discharge amount, the thickness of the adhesive becomes non-uniform. Specifically, it was found that an application start end of the adhesive and an application finish end of the adhesive are thicker than an application center portion between the application start end and the application finish end. For example, when placing (inserting) a permanent magnet into an accommodating groove (magnet hole) in the rotor core, an adhesive mechanically interferes with the magnet hole due to thickness non-uniformity (a relatively greater thickness of the application end). Therefore, a step of removing the adhesive that is scraped off due to the interference is required. In this case, the number of steps for manufacturing a rotor is increased. To eliminate the step of removing the adhesive that is scraped off due to the interference, the thickness of the adhesive may be reduced, taking it into consideration that the thickness becomes non-uniform when the thickness is large. However, if the thickness of the adhesive is reduced, the expansion rate of the adhesive needs to be increased. This reduces the density of the adhesive after foaming, which may result in a reduction in bonding strength between the permanent magnet and the magnet hole. Accordingly, it has been difficult to prevent non-uniformity in the thickness of an adhesive while preventing an increase in the number of manufacturing steps for manufacturing a rotor.

An exemplary aspect of the disclosure provides a method of manufacturing a rotor and an application device capable of preventing non-uniformity in the thickness of an adhesive, while preventing an increase in the number of manufacturing steps for manufacturing a rotor.

According to a first aspect of the present disclosure, there is provided a method of manufacturing a rotor including a rotor core and a permanent magnet that is bonded to the rotor core with an adhesive containing a foaming agent, the method including: applying the adhesive to an application area on an application surface of the permanent magnet or the rotor core, while moving a nozzle in a nozzle traveling direction that is a direction along the application surface, the nozzle having a discharge port to discharge the adhesive fed by a pump that feeds the adhesive; placing the permanent magnet on the rotor core, after applying the adhesive; and foaming and curing the adhesive after placing the permanent magnet; wherein applying the adhesive includes applying the adhesive such that the adhesive is spread to a portion on a front side with respect to the application area on the application surface, by moving the nozzle to a front side in the nozzle traveling direction with respect to a position in the application area at which feeding of the adhesive by the pump is finished.

A further study by the inventors of the present disclosure revealed that even after feeding of adhesive by the pump is finished, because the internal pressure of the nozzle (cylinder of the nozzle) is greater than the pressure outside the nozzle, adhesive in the nozzle comes out and is attached to the applied adhesive. The inventors also found that the thickness of the adhesive at the position where application of the adhesive is finished is greater than the desired thickness of the adhesive, and hence the thickness of the applied adhesive is not uniform. To solve this problem, according to the present disclosure, the adhesive is applied such that the adhesive is spread to a portion on a front side with respect to the application area on the application surface, by moving the nozzle to a front side in the nozzle traveling direction with respect to a position in the application area at which feeding of the adhesive by the pump is finished. In this way, even when the residual adhesive in the nozzle comes out, the residual adhesive can be spread and attached to the portion on the front side with respect to the application area on the application surface by the nozzle. As a result, the residual adhesive can be prevented from being attached to the surface in the thickness direction of the adhesive applied to the application area (surface in the direction orthogonal to the application surface). Consequently, it is possible to prevent an increase in the thickness of the adhesive at the application finish portion due to the residual adhesive in the nozzle, and to minimize non-uniformity in the thickness of the adhesive. Further, since a press machine for forming the applied adhesive into a sheet shape is not needed, it is possible to minimize non-uniformity in the thickness of the adhesive, while preventing an increase in the size of manufacturing equipment for the rotor. Further, since the non-uniformity in the thickness of the adhesive is prevented, it is possible to prevent interference between the adhesive and the rotor core or the permanent magnet when inserting the permanent magnet into the magnet hole in the rotor core. Accordingly, the step of removing the adhesive that is scraped off due to the interference is not needed, and it is therefore possible to prevent non-uniformity in the thickness of the adhesive while preventing an increase in the number of manufacturing steps for manufacturing the rotor.

According to a second aspect of the present disclosure, there is provided an application device that applies an adhesive to an application surface of a rotor core or a permanent magnet of a rotor, the rotor including the rotor core and the permanent magnet that is bonded to the rotor core with the adhesive containing a foaming agent, the application device including: a pump that feeds the adhesive; a nozzle having a discharge port to discharge the adhesive fed by the pump; and a moving mechanism unit that moves the nozzle relative to the application surface; wherein the application device is configured to apply the adhesive to an application area on the application surface while moving the nozzle in a nozzle traveling direction that is a direction along the application surface by using the moving mechanism unit; and wherein the nozzle is configured to spread the adhesive to a portion on a front side with respect to the application area on the application surface, when the nozzle moves to a front side in the nozzle traveling direction with respect to a position in the application area at which feeding of the adhesive by the pump is finished.

With the configuration described above, the application device according to the second aspect of the present disclosure is capable of preventing non-uniformity in the thickness of the adhesive, while preventing an increase in the number of manufacturing steps for manufacturing a rotor.

According to the present disclosure, it is possible to prevent non-uniformity in the thickness of an adhesive while preventing an increase in the number of manufacturing steps for manufacturing a rotor.

BRIEF DESCRIPTION OF THE DRAWINGS

FIG. 4 is a partial plan view illustrating the permanent magnet and a rotor core bonded with the adhesive according to the embodiment of the present disclosure.

FIGS. 5A and 5B are cross-sectional views schematically illustrating the adhesive before expansion (FIG. 5A) and after expansion (FIG. 5B) according to the embodiment of the present disclosure.

FIG. 6 is a conceptual diagram illustrating the configuration of the adhesive according to the embodiment of the present disclosure.

FIG. 10 is a cross-sectional view of a plunger pump according to the embodiment of the present disclosure.

FIG. 11 illustrates a step of applying the adhesive according to the embodiment of the present disclosure.

DETAILED DESCRIPTION OF EMBODIMENTS

Hereinafter, an embodiment of the present disclosure will be described with reference to the drawings.

[Structure of Rotor]

The structure of a rotor 100 according to the present embodiment will be described with reference to FIGS. 1 to 8.

Figure 1:
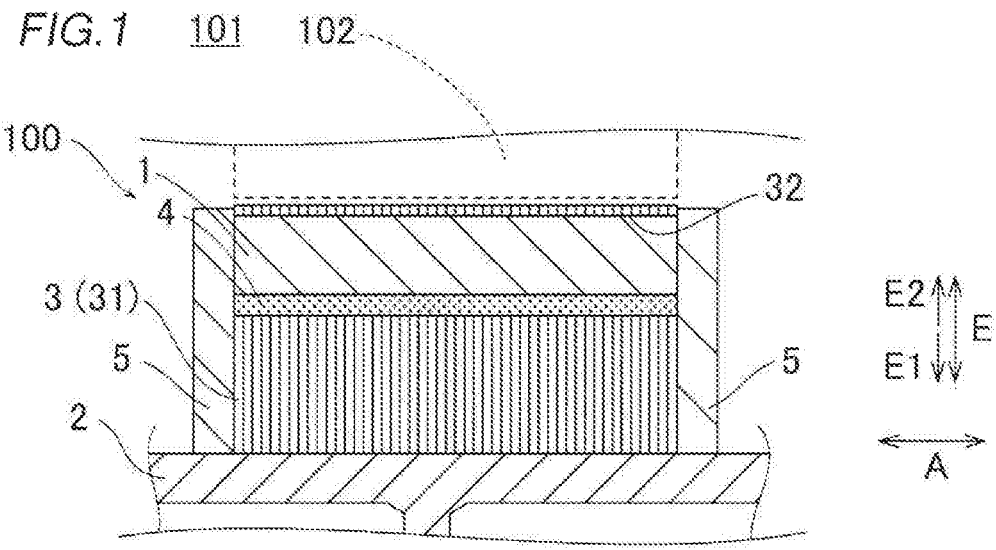
FIG. 1 is a cross-sectional view of a rotary electric machine (rotor) according to an embodiment of the present disclosure.

The terms "rotational axis direction" and "axial direction" as used herein refer to the direction along the rotational axis direction of the rotor 100 (direction along an axis C1 (see FIG. 2); arrow A direction in FIG. 1). The term "circumferential direction" refers to the circumferential direction of the rotor 100 (arrow B1 direction and arrow B2 direction in FIG. 2). The term "radially inner side" refers to the inner diameter side of the rotor 100 (arrow E1 direction side), and the "radially outer side" refers to the outer diameter side of the rotor 100 (arrow E2 direction side).

As illustrated in FIG. 1, the rotor 100 constitutes a part of an interior permanent magnet motor (IPM motor) (a part of a rotary electric machine 101) in which a plurality of permanent magnets 1 are disposed inside the rotor 100, for example. The rotary electric machine 101 is configured as, for example, one of a motor, a generator, and a motor generator that serves as both a motor and a generator. For example, the rotary electric machine 101 is configured as a travel motor for use in a hybrid vehicle or an electric vehicle.

The rotor 100 is disposed on the radially inner side of a stator 102 so as to face the stator 102 in the radial direction. That is, the rotary electric machine 101 is configured as a rotary electric machine of an inner rotor type. As illustrated in FIG. 1, the rotor 100 includes the permanent magnets 1, a hub member 2, a rotor core 3, an adhesive 4, and end plates 5. The rotor 100 is fixed to the hub member 2 connected to a shaft, and is configured to transmit rotational motion to (or receive rotational motion from) the outside of the rotary electric machine 101 via the hub member 2 and the shaft.

Figure 3:
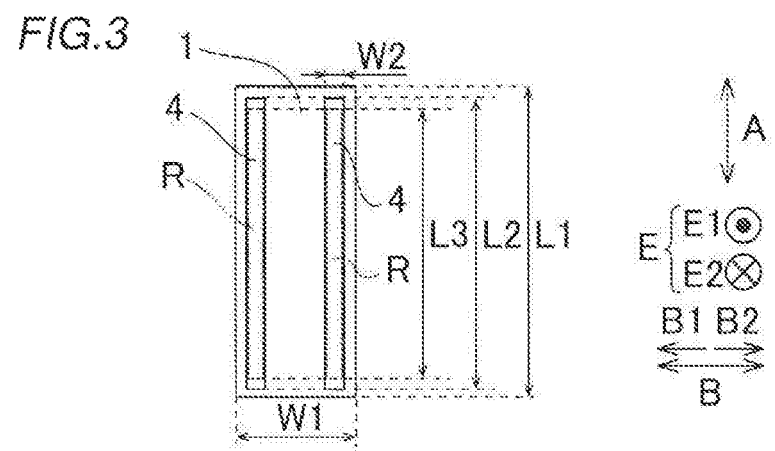
FIG. 3 is a side view illustrating the configuration of a permanent magnet and an adhesive according to the embodiment of the present disclosure.

As illustrated in FIG. 3, the permanent magnet 1 is formed so as to have a substantially rectangular shape that has a length L1 in the axial direction and a width W1 less than the length L1 as viewed from the radially inner side. For example, as illustrated in FIG. 4, the permanent magnet 1 has a substantially rectangular shape with two radially outer corners chamfered as viewed from one side in the axial direction (as viewed in the arrow A direction). The permanent magnet 1 is configured such that a radially inner surface 11 is a flat surface and a radially outer surface 12 is an arcuate surface as viewed from one side in the axial direction. The surface 11 is an example of an "application surface."

The two chamfered corners of the permanent magnet 1 are each provided with a surface 13 servings as an abutment surface that abuts against a magnet hole 32 (described below). The two surfaces 13 of the permanent magnet 1 are disposed so as to abut against (make surface contact with) respective wall surfaces 32a of the magnet hole 32. That is, the permanent magnet 1 is fixed while being positioned by the pair of wall surfaces 32a having a tapered shape as viewed in the arrow A direction.

As illustrated in FIG. 1, the hub member 2 is fixed to the rotor core 3. The hub member 2 is also fixed to the shaft (not illustrated). The hub member 2, the rotor core 3, and the shaft are configured to rotate together about the axis C1 serving as a center axis.

Figure 2:
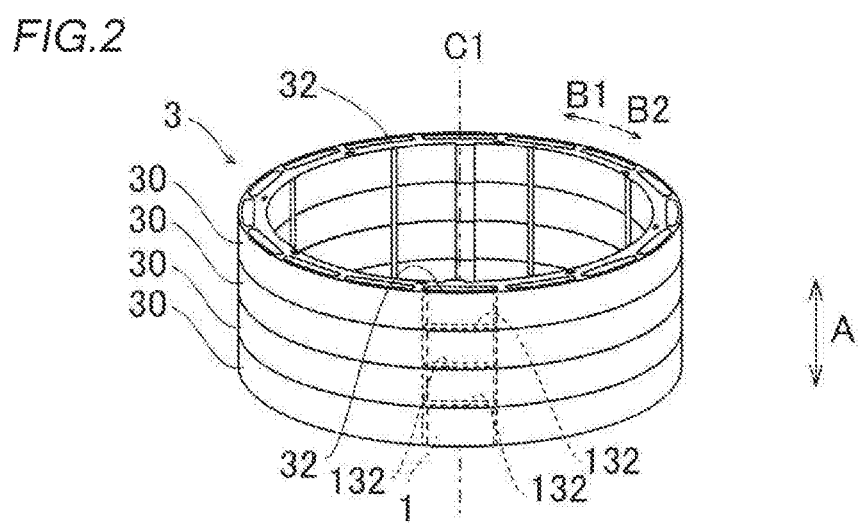
FIG. 2 is a perspective view of the rotor according to the embodiment of the present disclosure.

As illustrated in FIG. 2, for example, the rotor core 3 includes a plurality of (for example, four) core blocks 30 having an annular shape. The plurality of core blocks 30 are stacked on each other in the axial direction to have the center axis C1. The core blocks 30 are each formed by stacking a plurality of electromagnetic steel plates 31 (see FIG. 1; for example, silicon steel plates) having an annular shape on each other in the axial direction.

As illustrated in FIG. 2, the core blocks 30 are each provided with a plurality of (for example, 16) holes 132 configured as through holes extending in the axial direction. The plurality of core blocks 30 are stacked on each other in the axial direction such that the positions of the holes 132 overlap (or completely coincide) as viewed in the arrow A direction. Consequently, the holes 132 of the plurality of core blocks 30 are connected so as to be continuous with each other in the rotor core 3, thereby forming the magnet holes 32 into which the permanent magnets 1 are inserted in the axial direction. The plurality of magnet holes 32 are disposed circumferentially at equal angular intervals as viewed in the arrow A direction. The permanent magnets 1 are respectively disposed in the plurality of magnet holes 32. As illustrated in FIG. 1, the magnet holes 32 and the permanent magnets 1 are fixed (bonded) to each other by the adhesive 4.

Further, as illustrated in FIG. 4, each magnet hole 32 is provided with two groove portions 32b recessed toward the radially inner side of the rotor core 3 and extending in the axial direction, in which the adhesive 4 is disposed. Specifically, the two groove portions 32b are disposed near the opposite ends of the magnet hole 32 in the circumferential direction, and a projecting portion 32c is disposed between the two groove portions 32b. In other words, the projecting portion 32c of the rotor core 3 is configured to project from the radially inner side toward the radially outer side of the magnet hole 32 at the circumferential center of the magnet hole 32. Each of the two groove portions 32b has a bottom portion 32d, and a groove depth dl from a top surface 32e of the projecting portion 32c to the bottom portion 32d is greater than a thickness t1 (described below) (see FIG. 7) and less than or equal to a thickness t2. That is, the total length of the thickness t1 of the adhesive 4 and a length L21 of the permanent magnet 1 is less than a width W21 of the magnet hole 32, in the thickness direction of the adhesive 4 (E direction), such that the magnet hole 32 and the adhesive 4 do not interfere with each other.

As illustrated in FIG. 4, the adhesive 4 is disposed to be in contact with a part of the radially inner surface 11 of the permanent magnet 1. For example, as illustrated in FIG. 3, the adhesive 4 is disposed at two locations on one side (arrow B1 direction side) and on the other side (arrow B2 direction side) in the short-side direction, on the surface 11 of the permanent magnet 1. The adhesive 4 is formed so as to extend in the long-side direction (axial direction) of the surface 11 of the permanent magnet 1. Specifically, the adhesive 4 has a length L2 in the long-side direction, and has a width W2 in the short-side direction. The length L2 of the adhesive 4 in the long-side direction is greater than or equal to a length L3 of an application area R, and is a length of a portion having a thickness t11 when applied (portion having a thickness t1 when dried). The application area R is a part of the surface 11 of the permanent magnet 1 where an application center portion 143 (described below) of the adhesive 4 is applied.

As illustrated in FIG. 5B, when the permanent magnet 1 and the rotor core 3 are bonded with the adhesive 4 (when the rotor 100 is completed), the adhesive 4 contains a foaming agent 41 that has been foamed, and a main agent 42 and a curing agent 43 that have been cured. The foaming agent 41 is an example of an "expansion agent."

The foaming agent 41 is configured as an expansion agent that foams (expands) when heated to a temperature higher than or equal to an expansion temperature T1. Whereas, the main agent 42 and the curing agent 43 have properties of reacting with each other and cure when heated to a temperature higher than or equal to a curing temperature T2 that is higher than the expansion temperature T1. That is, the adhesive 4 is configured as a thermosetting adhesive.

Specifically, the foaming agent 41 is constituted as capsule bodies (see FIG. 6), and configured such that the capsule bodies expand to increase the volume when the foaming agent 41 is heated to a temperature higher than or equal to the expansion temperature T1. For example, the foaming agent 41 may be isopentane. The expansion temperature T1 can be set as a foam molding temperature at which the capsule bodies are foam-molded, for example.

As illustrated in FIG. 5, as the foaming agent 41 foams and expands, the thickness of the adhesive 4 changes from the thickness t1 to the thickness t2 that is greater than the thickness t1. As a result, the adhesive 4 is disposed to extend from the surface 11 of the permanent magnet 1 to the bottom portion 32d of the groove portion 32b. The foaming agent 41 remains as expanded capsule bodies in the adhesive 4 (in the magnet hole 32) even after being heated.

Figure 7:
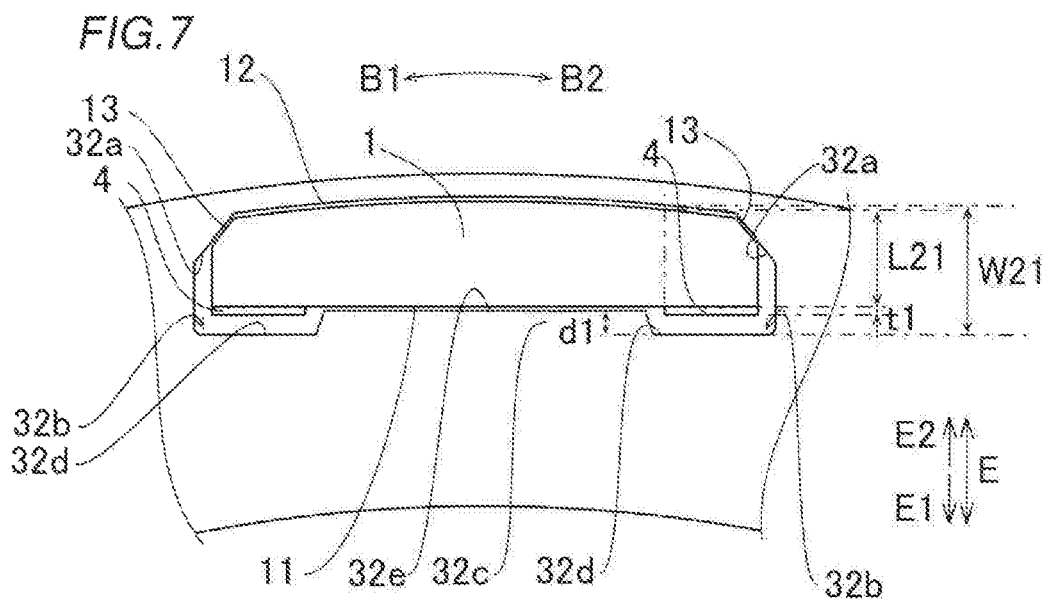
FIG. 7 is a partial plan view illustrating the rotor core with the permanent magnet inserted therein according to the embodiment of the present disclosure.

The proportion of the foaming agent 41 contained in the adhesive 4 is preferably set such that, when the foaming agent 41 foams and expands, the thickness changes to the thickness t2 which is three times or more to eight times or less the thickness t1 of the adhesive 4 before expansion. As illustrated in FIG. 7, before the foaming agent 41 of the adhesive 4 is foamed, the adhesive 4 and the bottom portion 32d of the groove portion 32b are away from each other, and the surface 13 of the permanent magnet 1 and the wall surface 32a of the magnet hole 32 are away from each other. After the foaming agent 41 of the adhesive 4 is foamed (see FIG. 4), the adhesive 4 is expanded and contacts the bottom portion 32d of the groove portion 32b. Then, the permanent magnet 1 is pressed radially outward, so that the surface 13 of the permanent magnet 1 and the wall surface 32a of the magnet hole 32 are placed in contact with each other.

The main agent 42 contains an epoxy-based resin (for example, bisphenol A liquid epoxy and epoxy resin polymer), for example. Meanwhile, the curing agent 43 contains dicyandiamide, for example. When the main agent 42 and the curing agent 43 of the adhesive 4 cure, then the permanent magnet 1 and the rotor core 3 are bonded and fixed. The curing temperature T2 is higher than a drying temperature T3 (described below), and higher than the expansion temperature T1. The curing temperature T2 is set in accordance with the combination of the main agent 42 and the curing agent 43, and is lower than a product upper limit temperature T5. The product upper limit temperature T5 can be set to a temperature that does not affect the performance of the rotor 100, for example.

As illustrated in FIG. 6, before the permanent magnet 1 and the rotor core 3 are bonded with the adhesive 4 and before the adhesive 4 is dried, the adhesive 4 contains a dilution solvent 44 that serves as a volatile agent that is volatile, the foaming agent 41 that serves as an expansion agent and that has not yet been foamed, and the main agent 42 and the curing agent 43 that have not yet been cured. After being dried (see FIG. 5A), the adhesive 4 contains the foaming agent 41, and the main agent 42 and the curing agent 43 that have not yet been cured. That is, after the adhesive 4 is dried, the amount of the dilution solvent 44 in the adhesive 4 has been decreased, or the dilution solvent 44 is generally not contained in the adhesive 4.

The dilution solvent 44 may be, for example, a volatile organic solvent such as ketones such as methyl ethyl ketone, alcohols, and ethers. The dilution solvent 44 preferably contains both methyl ethyl ketone and ethyl acetate. The dilution solvent 44 serves to improve the flowability of the adhesive 4, when contained in the adhesive 4.

The dilution solvent 44 is volatilized when heated to a temperature (for example, a temperature T10 in FIG. 16) higher than or equal to the drying temperature T3. The drying temperature T3 can be set to the boiling temperature of the dilution solvent 44 or a temperature close to the boiling temperature, for example. The drying temperature T3 is lower than the expansion temperature T1. The expansion temperature T1 is lower than the curing temperature T2. Accordingly, it is possible to volatilize the dilution solvent 44 without expanding the foaming agent 41, by setting the temperature of the adhesive 4 to a temperature lower than the expansion temperature T1 and higher than or equal to the drying temperature T3.

Figure 8:
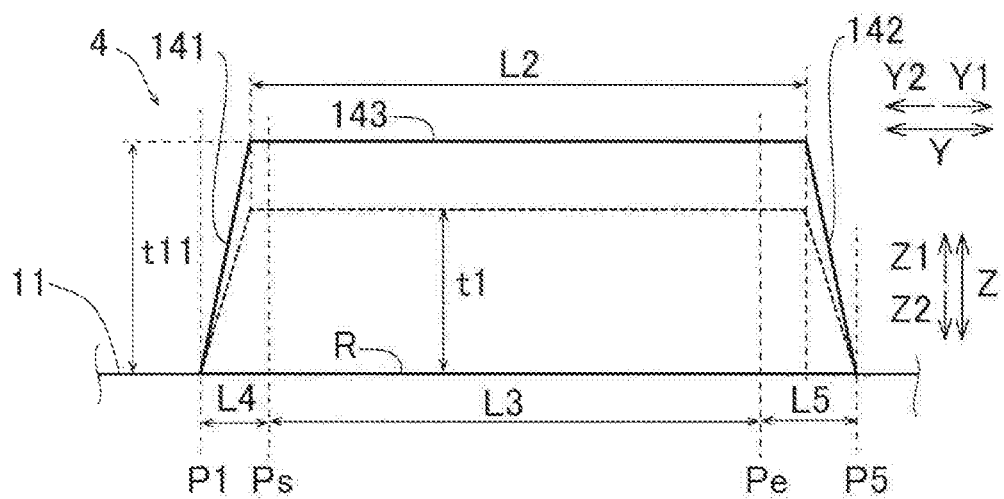
FIG. 8 is a diagram for explaining the relationship between the thickness of the adhesive before drying and the thickness after drying according to the embodiment of the present disclosure.

As illustrated in FIG. 8, the adhesive 4 includes an application start end 141, an application finish end 142, and the application center portion 143. The application center portion 143 is a part corresponding to the application area R, and formed between the application start end 141 and the application finish end 142. The application area R is an area on the surface 11 corresponding to the position for which a command discharge value of an application device 201 (described below) is greater than 0. That is, the application center portion 143 (application area R) is a part between a discharge start position Ps and a discharge end position Pe, and has the length L3 in the Y direction. The application start end 141 is an example of a "portion on a rear side with respect to an application area on an application surface." The application finish end 142 is an example of a "portion on a front side with respect to an application area on an application surface."

The application start end 141 is a part of the adhesive 4 on the direction A side (arrow Y2 direction side) with respect to the application center portion 143. When the adhesive 4 (described below) is applied, the application start end 141 is located on the rear side (arrow Y2 direction) in the traveling direction (arrow Y1 direction) of a nozzle 213, with respect to the application center portion 143 (application area R). The application start end 141 of the adhesive 4 that has been applied but not yet been dried has the thickness t11 in the direction (arrow Z1 direction and arrow Z2 direction) orthogonal to the surface 11 at a portion adjacent to the application center portion 143, and has a thickness that gradually decreases from the thickness t11 to 0 in the arrow Y2 direction. The application start end 141 has a length L4 less than the length L3 in the Y direction. Note that FIG. 8 is a schematic diagram in which the thickness of the adhesive 4 is exaggerated, and the relationship between the thickness and length of the adhesive 4 is not limited to the example of FIG. 8.

The application finish end 142 is a part of the adhesive 4 on the direction A side (arrow Y1 direction side) with respect to the application center portion 143. When the adhesive 4 is applied, the application finish end 142 is located on the front side (arrow Y1 direction) in the traveling direction (arrow Y1 direction) of the nozzle 213, with respect to the application center portion 143 (application area R). The application start end 141 of the adhesive 4 that has been applied but not yet been dried has the thickness t11 in the direction (arrow Z1 direction and arrow Z2 direction) orthogonal to the surface 11 at a portion adjacent to the application center portion 143, and has a thickness that gradually decreases from the thickness t11 to 0 in the arrow Y1 direction. The application finish end 142 has a length L5 less than the length L3 in the Y direction.

When the dilution solvent 44 is volatilized, the adhesive 4 is reduced in volume and made thinner. That is, the dried adhesive 4 has the thickness t1 less than the thickness t11. The length L2 in the Y direction of the part of the adhesive 4 having the thickness t11 longer than the length L3.

[Structure of Application Device for Adhesive According to Present Embodiment]

In the following, the structure of the application device 201 according to the present embodiment will be described. The application device 201 is a device that applies the adhesive 4 to the surface 11 of the permanent magnet 1 of the rotor 100 (see FIG. 1), which includes the rotor core 3 and the permanent magnet 1 that is bonded to the rotor core 3 with the adhesive 4.

Figure 9:
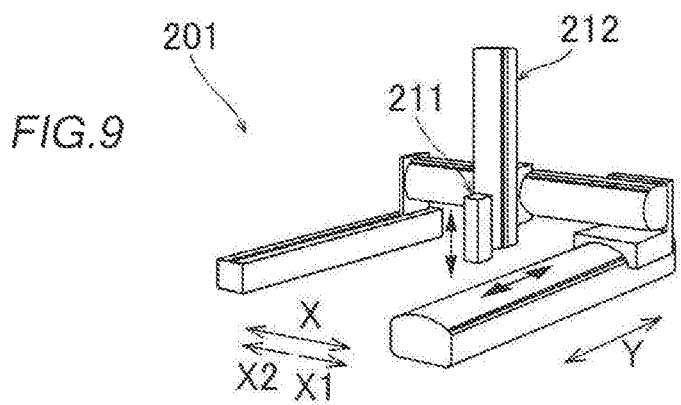
FIG. 9 is a perspective view of a three-axis orthogonal robot according to the embodiment of the present disclosure.

As illustrated in FIGS. 9 and 10, in the present embodiment, the application device 201 includes a plunger pump 211, a three-axis orthogonal robot 212, and the nozzle 213. The three-axis orthogonal robot 212 is an example of a "moving mechanism unit." The Z direction as used herein refers to the direction orthogonal to the surface 11; the Y direction refers to the traveling direction of the nozzle 213 (application direction of the adhesive 4); the arrow Y1 direction refers to the front side in the traveling direction; and the arrow Y2 direction refers to the rear side in the traveling direction. The X direction refers to the direction orthogonal to the Z direction and the Y direction. The plunger pump 211 is an example of a "pump."

The nozzle 213 has a discharge port 213a to discharge the adhesive 4. The three-axis orthogonal robot 212 is configured to move the nozzle 213 relative to the surface 11. In the present embodiment, the application device 201 is configured to apply the adhesive 4 to the application area R on the surface 11 while moving the nozzle 213 in the nozzle traveling direction (arrow Y1 direction) along the surface 11 by using the three-axis orthogonal robot 212.

Specifically, the plunger pump 211 stores therein the adhesive 4. The plunger pump 211 is fixed to the three-axis orthogonal robot 212. The three-axis orthogonal robot 212 is configured to move the plunger pump 211 relative to the permanent magnet 1. Specifically, the three-axis orthogonal robot 212 is configured to be capable of moving the plunger pump 211 in the horizontal direction (X-Y direction) and the vertical direction (Z direction).

In the present embodiment, as illustrated in FIG. 11, the nozzle 213 is configured to spread the adhesive 4 to a portion on the front side with respect to the application area R on the surface 11, when the nozzle 213 moves to the front side (arrow Y1 direction side) in the nozzle traveling direction with respect to the position Pe in the application area R at which discharge of the adhesive 4 is finished, with the distance between the nozzle 213 and the surface 11 in the direction (Z direction) orthogonal to the surface 11 set to a distance d12 that is less than the thickness t11 of the applied adhesive 4, and thereby to form the application finish end 142.

Further, the nozzle 213 is configured to apply the residual adhesive 4 in the nozzle 213 to a portion on the rear side with respect to the application area R on the surface 11, with the distance between the nozzle 213 and the surface 11 set to a distance d13 that is less than the thickness t11 of the adhesive 4 to be applied in the Z direction, and thereby to form the application start end 141. The distances d12 and d13 are substantially equal to each other.

Figure 12:
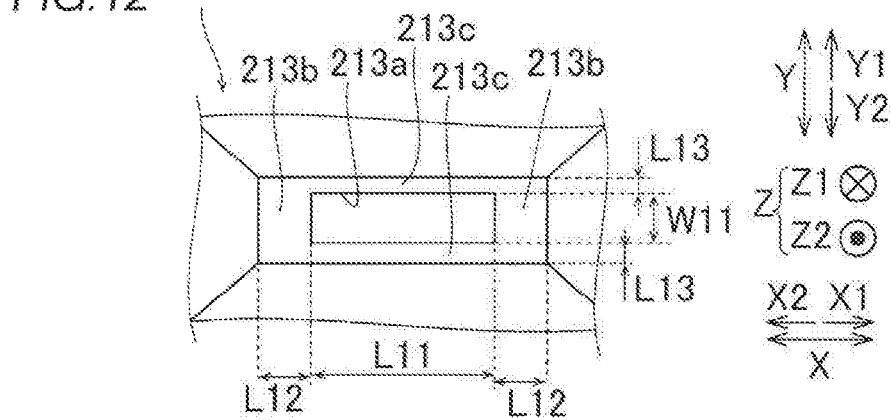
FIG. 12 illustrates a discharge port of a nozzle and a spreading portion according to the embodiment of the present disclosure.

Specifically, as illustrated in FIG. 12, in the present embodiment, the nozzle 213 includes spreading portions 213b that are disposed adjacent to two sides of the discharge port 213a in at least the X direction orthogonal to the nozzle traveling direction, and that spread the adhesive 4. Each spreading portion 213b includes a flat surface that is flush with the discharge port 213a. Further, the nozzle 213 includes adhesive release portions 213c. In the present embodiment, the adhesive release portions 213c are disposed adjacent to the discharge port 213a in the nozzle traveling direction (Y direction), and are configured such that a length L13 in the Y direction is less than a length L12 of the flat surface of each spreading portion 213b in the direction (X direction) orthogonal to the nozzle traveling direction.

Specifically, the discharge port 213a has a substantially rectangular shape with its long-side direction aligned with the X direction as viewed in the Z direction. For example, the discharge port 213a has a length L11 in the X direction, and a width W11 in the Y direction. The discharge port 213a is formed as an opening by being surrounded in a frame shape by the spreading portions 213b and the adhesive release portions 213c. The shape of the discharge port 213a is not limited to the shape described above, and may be any suitable shape such as a substantially triangular shape, a substantially rectangular shape, a substantially square shape, other polygonal shapes, a substantially circular shape, and a substantially elliptical shape. However, a substantially rectangular shape is preferable for adjusting the application amount.

Figure 13:
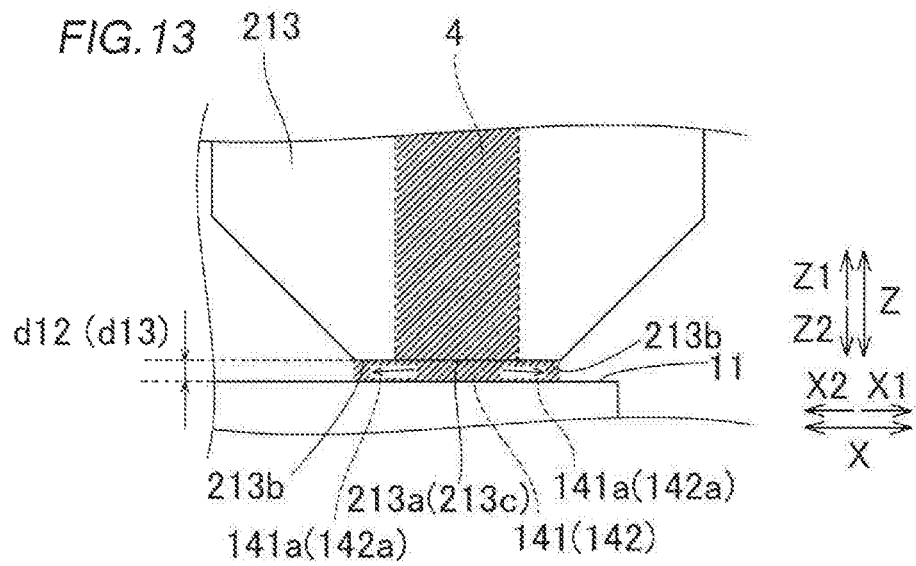
FIG. 13 illustrates the discharge port of the nozzle and the adhesive being spread by the spreading portion according to the embodiment of the present disclosure.

As illustrated in FIG. 13, in the present embodiment, each spreading portion 213b has a flat surface that is disposed substantially parallel to the surface 11 of the permanent magnet 1. The spreading portion 213b serves to spread the adhesive 4 discharged from the discharge port 213a in the Y direction and the X direction. That is, the spreading portion 213b is disposed to contact the surface of the adhesive 4 when the distance between the nozzle 213 and the surface 11 is the distance d12.

The length L12 of the spreading portion 213b is less than the length L11 of the discharge port 213a in the X direction. For example, the length L12 is less than or equal to half the length L11 and greater than or equal to one-fifth the length L11. Since the length L12 is less than or equal to half the length L11, it is possible to prevent interference of the application device 201 with other jigs. Also, since the length L12 is greater than or equal to one-fifth the length L11, it is possible to secure the length necessary to spread the adhesive 4.

As illustrated in FIG. 10, the plunger pump 211 includes a rod-shaped plunger 211a that pushes out the adhesive 4, and an accommodating member 211b that accommodates the rod-shaped plunger 211a. A moving wall portion 211c is disposed on the side portion of the cylindrical accommodating member 211b, and a moving wall portion 211d is disposed on a distal end portion of the accommodating member 211b. The moving wall portion 211c is disposed between an adhesive tank 214 that stores the adhesive 4 and an internal space of the accommodating member 211b. The moving wall portion 211d is disposed between the nozzle 213 and the internal space of the accommodating member 211b.

When the plunger 211a is moved to the Z1 direction side by a predetermined distance, with the moving wall portion 211c moved to connect the internal space of the accommodating member 211b and the adhesive tank 214, and with the moving wall portion 211d blocking the distal end portion of the accommodating member 211b, a predetermined constant amount of adhesive 4 is suctioned into the cylindrical accommodating member 211b. After that, when the plunger 211a is moved to the arrow Z2 direction side by a predetermined distance, with the moving wall portion 211c moved such that the moving wall portion 211d blocks the side portion of the accommodating member 211b, and with the moving wall portion 211d moved to connect the internal space of the accommodating member 211b and the nozzle 213, the adhesive 4 of a specified discharge amount (discharge amount command value) is applied to the surface 11 of the permanent magnet 1.

Figure 14:
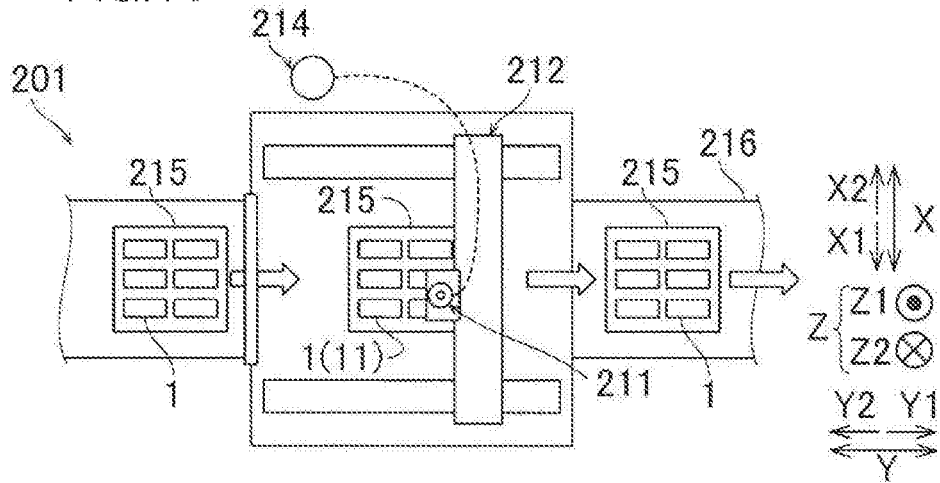
FIG. 14 is a top view of an application device according to the embodiment of the present disclosure.

As illustrated in FIG. 14, the application device 201 further includes a pallet 215 on which the plurality of permanent magnets 1 are placed. In the example illustrated in FIG. 14, six permanent magnets 1 are placed on each pallet 215. However, the number of permanent magnets 1 is not limited thereto. A plurality of the pallet 215 are provided. The pallets 215 are sequentially moved under the plunger pump 211 by a conveyer 216. The application device 201 is configured to be capable of applying the adhesive 4 sequentially to the plurality of permanent magnets 1 placed on each of the plurality of pallets 215 by using the same nozzle 213.

[Rotor Manufacturing Method According to Present Embodiment]

Figure 15:
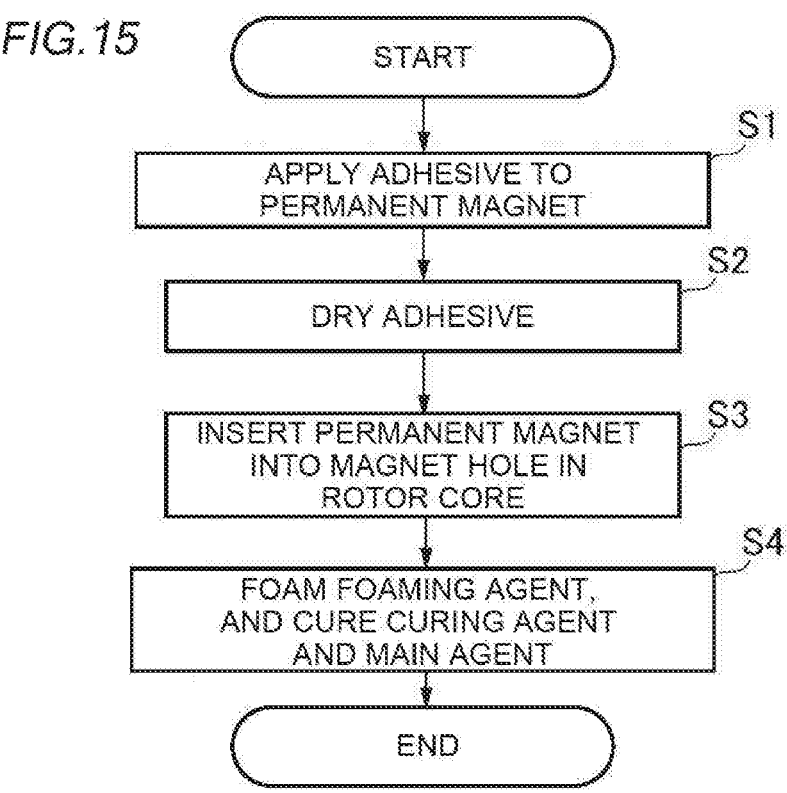
FIG. 15 is a flowchart illustrating a manufacturing process according to the embodiment of the present disclosure.
Figure 16:
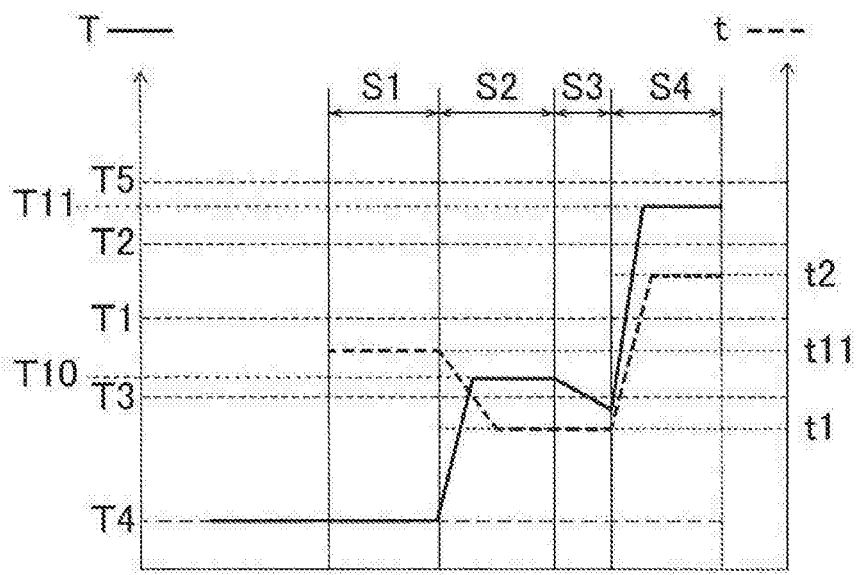
FIG. 16 illustrates changes in thickness and temperature of the adhesive during the manufacturing process according to the embodiment of the present disclosure.

In the following, a method of manufacturing the rotor 100 according to the present embodiment will be described. FIG. 15 illustrates a flowchart of a method of manufacturing the rotor 100 according to the present embodiment. FIG. 16 is a chart illustrating the state of the adhesive 4 during the process of manufacturing the rotor 100 (steps S1 to S4), in which the horizontal axis indicates the time and the vertical axis indicates the temperature of the adhesive 4 (vertical axis on the left) and the thickness of the adhesive 4 (vertical axis on the right).

<Step of Applying Adhesive>

In step S1, the adhesive 4 is applied to the permanent magnet 1. Specifically, in the present embodiment, the adhesive 4 (see FIG. 6) is applied to the surfaces 11 of the plurality of permanent magnets 1 (see FIG. 14) placed on the pallet 215. The adhesive 4 contains the foaming agent 41 servings as an expansion agent that expands when heated to a temperature higher than or equal to the expansion temperature T1, the dilution solvent 44 that is volatile, and the main agent 42 and the curing agent 43 that cure when heated to a temperature higher than or equal to the curing temperature T2 that is higher than the expansion temperature T1.

Specifically, as illustrated in FIG. 11, in the present embodiment, the adhesive 4 is applied to the application area R on the surface 11, while moving the nozzle 213 having the discharge port 213a for discharging the adhesive 4, in the nozzle traveling direction (arrow Y1 direction) along the surface 11 of the permanent magnet 1. The nozzle 213 is moved in the Y direction and the Z direction with respect to the surface 11 by the three-axis orthogonal robot 212.

Specifically, in the present embodiment, first, the residual adhesive 4 in the nozzle 213 is applied to a portion on the rear side with respect to the application area R on the surface 11, while the distance (clearance) between the nozzle 213 and the surface 11 is set to the distance d13 that is less than the thickness t11 of the adhesive 4 to be applied in the direction (Z direction) orthogonal to the surface 11, so that the application start end 141 is formed. In the present embodiment, the distance d13 is preferably set to be less than or equal to half the thickness t11 of the adhesive 4 to be applied. The residual adhesive 4 as used herein means the adhesive 4 that is remaining in the nozzle 213 from the previous (last) step of applying the adhesive 4, and that may be discharged from the nozzle 213 even when the discharge amount command value is 0. When the discharge amount command value is 0, it means that discharging (feeding) of the adhesive 4 by the plunger pump 211 is stopped. Note that, in this step, the thickness t11 of the adhesive 4 is set such that the total length of the thickness t1 of the adhesive 4 and the length L21 of the permanent magnet 1 is less than the width W21 of the magnet hole 32, in the thickness direction of the adhesive 4, in the thickness direction (E direction) of the adhesive 4.

Figure 17:
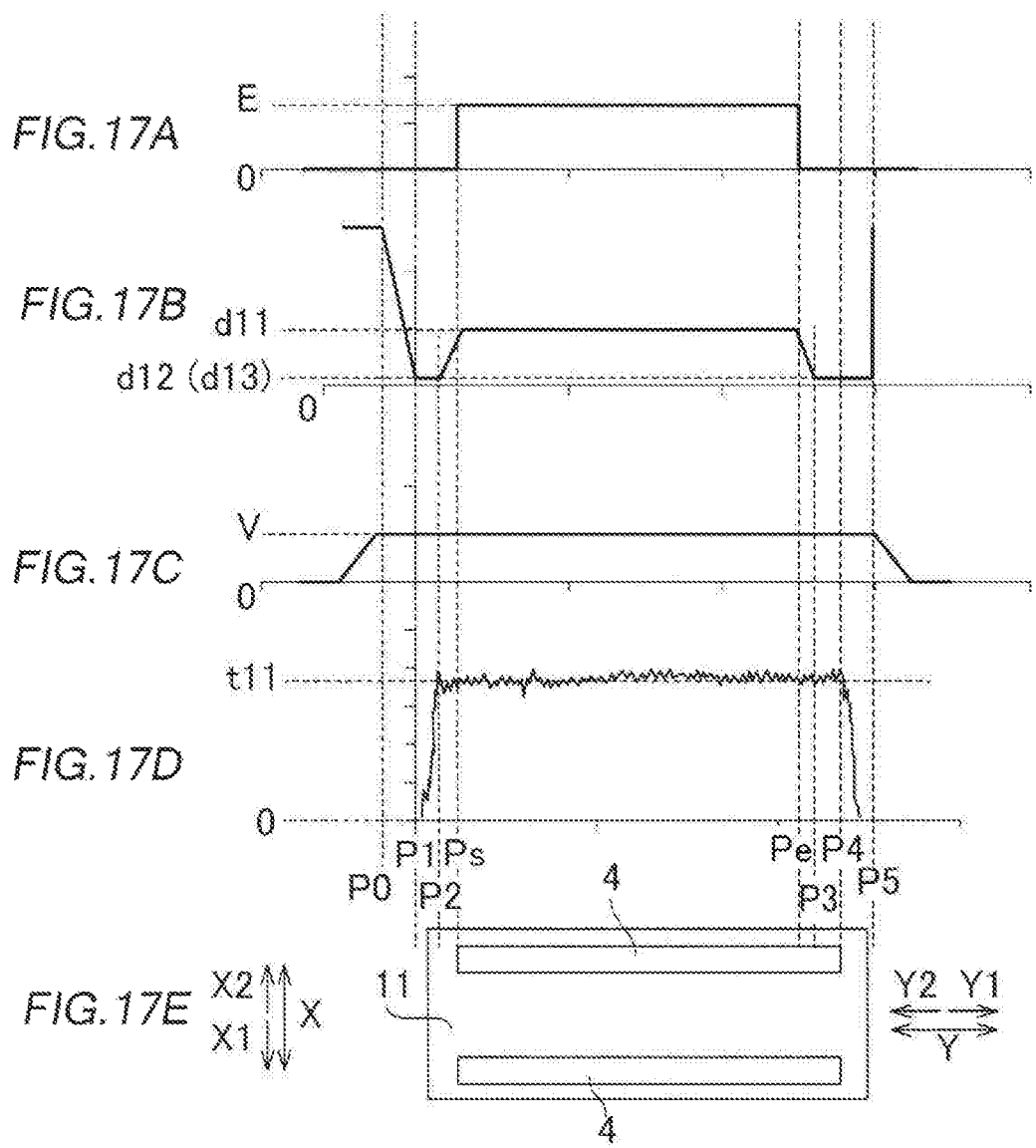
FIGS. 17A-17E are diagrams for explaining the relationship between the operation of the nozzle and the thickness of the adhesive according to the embodiment of the present disclosure, illustrating a discharge command value (FIG. 17A), a distance between the nozzle and a surface (FIG. 17B), a moving speed of the nozzle (FIG. 17C), a thickness of the adhesive (FIG. 17D), and a plan view of the permanent magnet (FIG. 17E).

Specifically, while the discharge amount command value is set to 0 as illustrated in FIG. 17A, the nozzle 213 is moved in the arrow Y1 direction and the arrow Z2 direction, from a position P0 on the rear side with respect to the discharge start position Ps in the application area R, to a position P1 at which the distance between the nozzle 213 and the surface 11 is the distance d13 as illustrated in FIG. 17B. Then, the nozzle 213 is moved in the arrow Y1 direction to a position P2 on the rear side with respect to the discharge start position Ps, with the distance d13 between the nozzle 213 and the surface 11, so that the residual adhesive 4 in the nozzle 213 is applied to the surface 11. Then, the nozzle 213 is moved in the arrow Y1 direction and the arrow Z2 direction, so that the distance between the nozzle 213 and the surface 11 is changed from d13 to d11, and the residual adhesive 4 is applied to the surface 11. In this way, the application start end 141 is formed on the arrow Y2 side with respect to the discharge start position Ps on the surface 11. Here, as illustrated in FIGS. 17D and 11, a distance d11 is greater than or equal to the thickness t11 of the adhesive 4 in the application area R.

As illustrated in FIG. 17C, the moving speed of the nozzle 213 is set to a constant moving speed V, from the position P0 to the discharge start position Ps, and to a position P5 on the arrow Y1 direction side with respect to the discharge end position Pe. Further, as illustrated in FIG. 17A, the discharge amount command value of the application device 201 is set to a constant discharge amount command value E, from the discharge start position Ps to the discharge end position Pe, and is set to 0 at other positions. That is, in the present embodiment, the adhesive 4 is applied to the application area R, while the discharge amount of the adhesive 4 from the discharge port 213a is maintained constant, and the moving speed of the nozzle 213 in the nozzle traveling direction is constant, so that the application center portion 143 is formed.

Then, as illustrated in FIG. 11, in the present embodiment, the nozzle 213 is moved to the front side (arrow Y1 direction side) in the nozzle traveling direction with respect to the discharge end position Pe in the application area R at which discharge of the adhesive 4 is finished (feeding of the adhesive 4 by the plunger pump 211 is finished) while the distance between the nozzle 213 and the surface 11 in the direction (Z direction) orthogonal to the surface 11 is set to a distance d12 less than the thickness t11 of the applied adhesive 4, and thereby the adhesive 4 is applied so as to be spread to a portion on the front side with respect to the application area R on the surface 11. In this way, the application finish end 142 is formed. In the present embodiment, the distance d12 is preferably set to be less than or equal to half the thickness t11 of the applied adhesive 4. For example, the distances d12 and d13 are substantially equal to each other.

Specifically, as illustrated in FIG. 17A, even after the discharge amount command value is set to 0 at the discharge end position Pe, the nozzle 213 is kept moving in the arrow Y1 direction. While the nozzle 213 is moved from the discharge end position Pe to the position P3, the distance between the nozzle 213 and the surface 11 is gradually reduced from d11 to d12. As a result, the residual adhesive 4 in the nozzle 213 is applied and spread on a portion on the arrow Y1 direction side with respect to the discharge end position Pe on the surface 11 by the nozzle 213 (spreading portion 213b).

Then, the nozzle 213 is moved from the position P3 to the position P5 in the arrow Y1 direction while the distance between the nozzle 213 and the surface 11 is set to d12, and thereby the residual adhesive 4 is applied so as to be spread on the surface 11. In this way, the application finish end 142 is formed. Accordingly, the thickness of the adhesive 4 gradually decreases from t11 to 0 from the position P4 toward the position P5. After that, at the position P5, the nozzle 213 is moved away from the surface 11, and is moved to the next application area R to which the adhesive 4 is to be applied (the other application area R on the X direction side on the surface 11), or moved near another permanent magnet 1.

As illustrated in FIG. 13, in the present embodiment, when the application start end 141 and the application finish end 142 are formed, with the nozzle 213 and the surface 11 spaced by the distance d12 or d13, the adhesive 4 is applied to the surface 11 while the applied adhesive 4 is caused to protrude in the direction orthogonal to the moving direction of the nozzle 213 by the spreading portions 213b.

Figure 18:
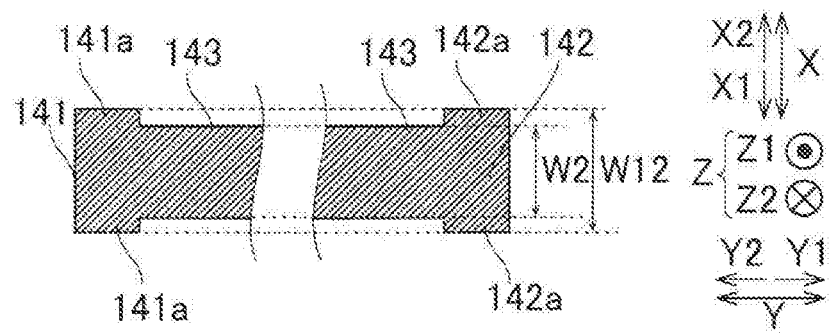
FIG. 18 is a plan view schematically illustrating the applied adhesive according to the embodiment of the present disclosure.

Specifically, the adhesive 4 discharged from the discharge port 213a of the nozzle 213 is spread in the X direction between the spreading portions 213b and the surface 11, so that protruding portion 141s of the application start end 141 and protruding portions 142a of the application finish end 142 are formed as illustrated in FIG. 18. Since the application start end 141 has the protruding portions 141a, and the application finish end 142 has the protruding portions 142a, a width W12 of the application start end 141 and the application finish end 142 is greater than the width W2 of the application center portion 143 in the X direction. In FIG. 18, the relationship between the width W2 and the width W12 is exaggerated for purposes of illustration, and is not limited to the illustrated example.

Then, as illustrated in FIG. 17E, after the adhesive 4 is applied to one of the arrow X1 direction side and the arrow X2 direction side on the surface 11 by the plunger pump 211, the adhesive 4 is applied to the other of the arrow X1 direction side and the arrow X2 direction side on the surface 11 by the same plunger pump 211. Similarly, the adhesive 4 is applied to the surfaces 11 of the plurality of permanent magnets 1 by the same (single) plunger pump 211. That is, after the adhesive 4 is applied to the surface 11 of one permanent magnet 1, the adhesive 4 is applied to the surface 11 of another permanent magnet 1.

After application of the adhesive 4 to the surfaces 11 of the plurality of permanent magnets 1 placed on one pallet 215 is completed, another pallet 215 is moved under the plunger pump 211 by the conveyer 216. Then, the adhesive 4 is applied to the surfaces 11 of the plurality of permanent magnets 1 placed on the moved pallet 215. Then, the process proceeds to step S2.

<Step of Drying Adhesive>

In step S2 (see FIG. 15), the adhesive 4 is dried and made thinner. In the present embodiment, as illustrated in FIG. 8, the thickness t11 is reduced to the thickness t1 by volatilizing the dilution solvent 44 of the adhesive 4. Specifically, as illustrated in FIG. 16, the adhesive 4 is heated to a temperature T10 that is higher than or equal to the drying temperature T3 and lower than the expansion temperature T1. For example, the adhesive 4 is heated by blowing hot air (air blow) to the adhesive 4 in an air-heating furnace (not illustrated) or by heating the permanent magnet 1 with a heater. Then, the process proceeds to step S3.

<Step of Placing Permanent Magnet>

Figure 19:
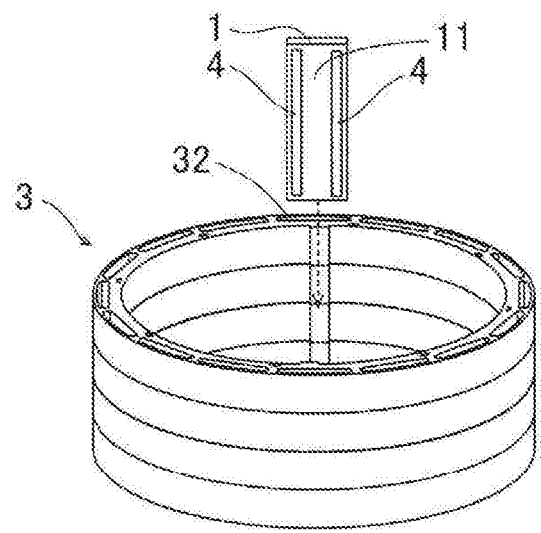
FIG. 19 illustrates a step of placing the permanent magnet into a magnet hole according to the embodiment of the present disclosure.

In step S3 (see FIG. 15), as illustrated in FIG. 19, the permanent magnet 1 with the dried adhesive 4 disposed thereon is inserted into the magnet hole 32 in the rotor core 3. Specifically, the rotor core 3 and the permanent magnet 1 with the surface 11, on which the adhesive 4 is disposed, facing radially outward are moved relative to each other, so that the permanent magnet 1 is inserted into the corresponding magnet hole 32. Although only one permanent magnet 1 is illustrated in FIG. 19, the permanent magnets 1 are inserted into the respective magnet holes 32. Then, as illustrated in FIG. 7, the bottom portion 32d of the groove portion 32b of the magnet hole 32 and the adhesive 4 having the thickness t1 are disposed apart from each other.

<Step of Curing Adhesive>

In step S4 (see FIG. 15), the permanent magnet 1 and the rotor core 3 are bonded, by curing the main agent 42 and the curing agent 43 of the adhesive 4. Specifically, the adhesive 4 is heated to a temperature T11 (see FIG. 16) that is higher than the expansion temperature T1 and higher than or equal to the curing temperature T2. For example, the adhesive 4 is heated to the temperature T11 by hot air, in an air-heating furnace. As a result, as illustrated in FIG. 5, the foaming agent 41 of the adhesive 4 foams and expands, so that the thickness of the adhesive 4 changes from the thickness t1 to the thickness t2. Also, as illustrated in FIG. 4, the thickness t2 of the adhesive 4 becomes substantially equal to the distance from the surface 11 of the permanent magnet 1 to the bottom portion 32d of the groove portion 32b. That is, the adhesive 4 expands to extend from the surface 11 of the permanent magnet 1 to the bottom portion 32d of the groove portion 32b. Further, the adhesive 4 expands, so that the surface 13 of the permanent magnet 1 is pressed radially outward. Consequently, the wall surface 32a of the magnet hole 32 and the surface 13 of the permanent magnet 1 abut against each other.

Then, the main agent 42 and the curing agent 43 of the adhesive 4 cure, so that the permanent magnet 1 and the magnet hole 32 are fixed with the cured adhesive 4. After that, the rotor 100 is completed. Then, as illustrated in FIG. 1, the rotor 100 is assembled to the stator 102, so that the rotary electric machine 101 is completed.

[Results of Comparison with Rotor Manufacturing Method According to Comparative Example]

In the following, the result of comparison between a method of manufacturing a rotor according to a comparative example and the method of manufacturing the rotor 100 according to the present embodiment will be described.

Figure 20A:
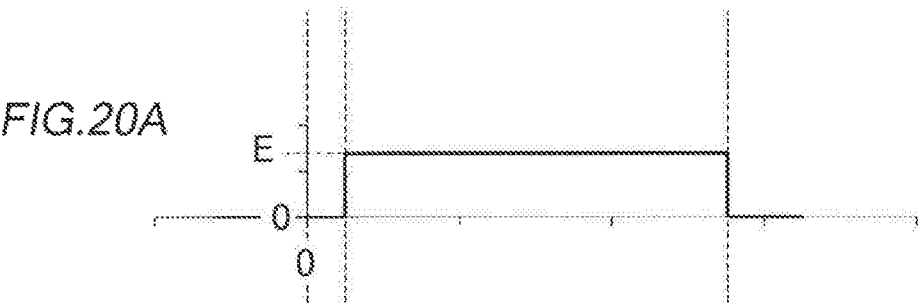
FIGS. 20A-20D are diagrams for explaining a method of manufacturing a rotor according to a comparative example, illustrating a discharge command value (FIG. 20A), a distance between a nozzle and a surface (FIG. 20B), a moving speed of the nozzle (FIG. 20C), and a thickness of an adhesive (FIG. 20D).
Figure 20B:
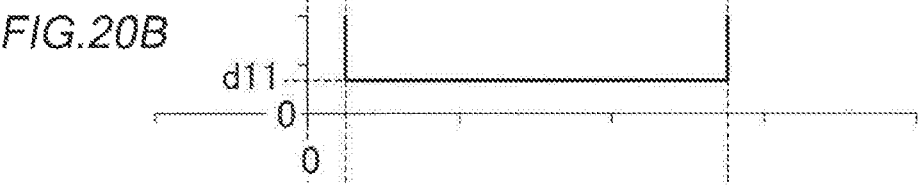
Figure 20C:
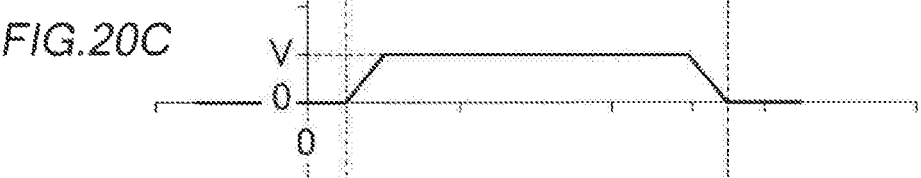

As illustrated in FIGS. 20A, 20B, and 20C, according to the method of manufacturing a rotor of the comparative example, a nozzle was moved toward an application surface in the discharge start position Ps in the Z direction until the distance therebetween became d11. After that, the discharge amount command value was set to E, and the nozzle was moved in the arrow Y1 direction while gradually increasing the moving speed to V. Then, an adhesive was applied to the application surface at the moving speed V. Subsequently, at the discharge end position Pe, the discharge amount command value was set to 0, and movement of the nozzle in the Y direction was stopped. Meanwhile, the nozzle was moved in the Z direction so as to be spaced away from the application surface. Then, the thickness of the adhesive formed on the application surface with this manufacturing method was measured. Also, the thickness of the adhesive 4 formed with the method of manufacturing the rotor 100 of the present embodiment was measured.

Figure 20D:
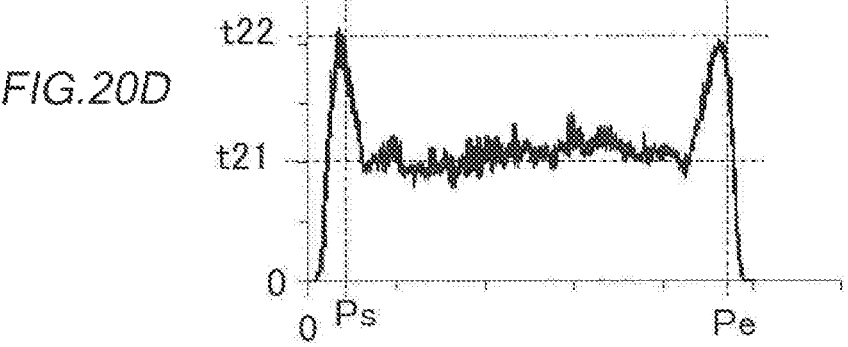

The measurement results of the thickness of the adhesive of the comparative example of FIG. 20D showed a thickness t22 of the adhesive near the discharge start position Ps and the discharge end position Pe was two or more times a thickness t21 of the adhesive at the application center portion. That is, it was found that the thickness of the adhesive achieved by the method of manufacturing a rotor of the comparative is not uniform.

On the other hand, as illustrated in FIG. 17D, according to the method of manufacturing the rotor 100 of the first embodiment, the thickness t11 of the adhesive 4 after drying was substantially uniform (for example, the variation range was less than or equal to one-fourth the thickness t11). That is, it was found that, in the present embodiment, the thickness of the adhesive 4 can be made substantially uniform without using a press machine.

[Effects of Manufacturing Method of Present Embodiment]

With the manufacturing method according to the present embodiment, the following effects can be obtained.

As described above, in the present embodiment, the step of applying the adhesive (4) includes a step of applying the adhesive (4) such that the adhesive (4) is spread to a portion (142) on a front side with respect to the application area (R) on the application surface (11), by moving the nozzle (213) to a front (arrow Y1 direction) side in the nozzle traveling direction with respect to a position (Pe) in the application area (R) at which feeding of the adhesive (4) by the pump (211) is finished. Therefore, even when the residual adhesive (4) in the nozzle (213) comes out, the residual adhesive (4) can be spread and attached to the portion (142) on the front side with respect to the application area (R) on the application surface (11) by the nozzle (213). As a result, the residual adhesive (4) can be prevented from being attached in the thickness direction of the adhesive (4) applied to the application area (R) (direction (Z direction) orthogonal to the application surface (11)). Consequently, it is possible to prevent an increase in the thickness (t11) of the adhesive (4) at the application finish end (142) due to the residual adhesive (4) in the nozzle (213), and to minimize non-uniformity in the thickness (t11) of the adhesive (4). Further, since a press machine for forming the applied adhesive (4) into a sheet shape is not needed, it is possible to minimize non-uniformity in the thickness (t11, t1) of the adhesive (4), while preventing an increase in the size of manufacturing equipment for the rotor (100). Further, since the non-uniformity in the thickness (t11, t1) of the adhesive (4) is prevented, it is possible to prevent interference between the adhesive (4) and the rotor core (3) or the permanent magnet (1) when inserting the permanent magnet (1) into the magnet hole (32) in the rotor core (3). Accordingly, the step of removing the adhesive (4) that is scraped off due to the interference is not needed, and it is therefore possible to prevent non-uniformity in the thickness (t11, t1) of the adhesive (4) while preventing an increase in the number of manufacturing steps for manufacturing the rotor (100).

Further, as described above, in the present embodiment, the step of applying the adhesive (4) includes a step of applying the adhesive (4), by moving the nozzle (213) to a front (arrow Y1 direction) side in the nozzle traveling direction with respect to a position (Pe) in the application area (R) at which discharge of the adhesive (4) is finished, while reducing a distance (d12) between the nozzle (213) and the application surface (11) to less than a thickness (t11) of the applied adhesive (4) in a direction (Z direction) orthogonal to the application surface (11). With this configuration, since the distance (d12) between the nozzle (213) and the application surface (11) is reduced, the residual adhesive (4) can be more reliably spread and attached to the portion (142) on the front side with respect to the application area (R) by the nozzle (213). Also, since the thickness of the adhesive (4) that is spread and attached can be prevented from exceeding the thickness (t11) of the adhesive (4), it is possible to more reliably prevent non-uniformity in the thickness (t11, t1) of the adhesive (4).

Further, as described above, in the present embodiment, the step of applying the adhesive (4) includes a step of applying the adhesive (4) to a portion (142) on a front side with respect to the application area (R) on the application surface (11), by moving the nozzle (213) to the front (arrow Y1 direction) side in the nozzle traveling direction with respect to the position (Pe) in the application area (R) at which discharge is finished, while reducing the distance (d12) between the nozzle (213) and the application surface (11) to less than or equal to half the thickness (t11) of the applied adhesive (4) in the direction (Z direction) orthogonal to the application surface (11). With this configuration, since the distance between the nozzle and the application surface is smaller compared to the case where the nozzle is moved while the distance is set to be greater than half the thickness of the applied adhesive, the residual adhesive (4) in the nozzle (213) can be more reliably spread to the portion (142) on the front side with respect to the application area (R).

Further, as described above, in the present embodiment, the step of applying the adhesive (4) includes a step of applying the adhesive (4) remaining in the nozzle (213) to a portion (141) on a rear side (arrow Y2 direction) with respect to the application area (R) on the application surface (11) while a distance (d13) between the nozzle (213) and the application surface (11) is set to be less than a thickness (t11) of the adhesive (4) to be applied in a direction (Z direction) orthogonal to the application surface (11), and thereafter applying the adhesive (4) to the application area (R) on the application surface (11) while the distance (d11) between the nozzle (213) and the application surface (11) is set to be greater than or equal to the thickness (t11) of the adhesive (4) to be applied. There may be a case where the adhesive is applied sequentially to different application surfaces (for example, different permanent magnets (1)) using the same nozzle. In this case, when starting application of the adhesive, there may be adhesive remaining in the nozzle from the previous (last) application of the adhesive. If application of the adhesive is started at the discharge start position in the application area under this condition, the remaining adhesive is discharged to the application area in addition to the adhesive discharged in response to a command, which may increase the thickness of the adhesive at the discharge start position. In view of this, in the present embodiment, the adhesive (4) remaining in the nozzle (213) is applied to the portion on the rear side with respect to the application area (R) on the application surface (11) while the distance (d13) between the nozzle (213) and the application surface (11) is set to be less than the thickness (t11) of the adhesive (4) to be applied, and thereafter the adhesive (4) is applied to the application area (R). Accordingly, even when the adhesive (4) is remaining in the nozzle (213), the residual adhesive (4) in the nozzle (213) is applied to the portion on the rear side of the application area (R) before starting application (discharge) of the adhesive (4) to the application area (R), and therefore it is possible to prevent an increase in the thickness (t11) of the adhesive (4) at the discharge start position (Ps) in the application area (R) as well. Consequently, even when the adhesive (4) is applied to different application surfaces (11) (for example, different permanent magnets (1)) using the same nozzle (213), it is possible to prevent non-uniformity in the thickness (t11) of the adhesive (4).

Further, as described above, in the present embodiment, the step of applying the adhesive (4) includes a step of applying the adhesive (4) to the application area (R) on the application surface (11), while maintaining a discharge amount (E) of the adhesive (4) from the discharge port (213a) constant, and maintaining a moving speed (V) of the nozzle (213) in the nozzle traveling direction constant. With this configuration, it is possible to simplify the control of the discharge amount (E) and the control of the moving speed (V) of the nozzle (213), and hence to reduce the control load of the application device (201).

Further, in the present embodiment, the step of applying the adhesive (4) includes a step of applying the adhesive (4) containing a volatile agent (44) to the application surface (11) of the permanent magnet (1) such that the adhesive (4) is spread to the portion (142) on the front side with respect to the application area (R) on the application surface (11), and the method further includes a step of drying the adhesive (4) by volatilizing the volatile agent (44), after the step of applying the adhesive (4) and before the step of placing the permanent magnet (1). With this configuration, the adhesive (4) is reduced in thickness (t11) to be thinner, by drying the adhesive (4). Accordingly, since the adhesive is made thinner, it is possible to prevent interference between the adhesive (4) and the magnet hole (32) when inserting the permanent magnet (1) into the rotor core (3) (magnet hole (32)). Also, if the volatile agent (44) has properties of improving the flowability of the adhesive (4), the flowability of the adhesive (4) can be reduced by volatilizing the volatile agent (44). Accordingly, it is possible to more reliably prevent deformation of the adhesive (4) than before the drying.

Further, in the present embodiment, the step of applying the adhesive (4) includes a step of applying the adhesive (4) containing an expansion agent (41) and a volatile agent (44) to the application surface (11) of the permanent magnet (1) such that the adhesive (4) is spread to the portion (142) on the front side with respect to the application area (R) on the application surface (11); a step of placing the permanent magnet (1) includes a step of inserting the permanent magnet (1) with the adhesive (4) applied thereon into a magnet hole (32) extending in a rotational axis direction of the rotor core (3), after the step of drying the adhesive (4); and a step of curing the adhesive (4) includes a step of curing the adhesive (4) by expanding the expansion agent (41). With this configuration, since the adhesive (4) is dried and made thinner, the permanent magnet (1) can be inserted into the magnet hole (32), with a clearance provided between the magnet hole (32) and the adhesive (4). Further, after the permanent magnet (1) is inserted in the magnet hole (32), the clearance can be filled with the adhesive (4) by expanding the expansion agent (41). Accordingly, while allowing easier insertion of the permanent magnet (1) into the magnet hole (32), the permanent magnet (1) can be fixed to the magnet hole (32), with the clearance between the magnet hole (32) and the permanent magnet (1) filled.

Further, in the present embodiment, the rotor core (3) is provided with a magnet hole (32) into which the permanent magnet (1) is inserted, and the step of applying the adhesive (4) includes a step of applying the adhesive (4) such that a total length of a thickness (t1) of the adhesive (4) and a length (L21) of the permanent magnet (1) is less than a width (W21) of the magnet hole (32) in a thickness direction (E direction) of the adhesive (4). With this configuration, it is possible to prevent mechanical interference between the adhesive (4) and the magnet hole (32) when inserting the permanent magnet (1) into the magnet hole (32).

[Effects of Configuration of Application Device of Present Embodiment]

With the application device 201 of the present embodiment, the following effects can be obtained.

In the present embodiment, an application device (201) applies an adhesive (4) to an application surface (11) of a rotor core (3) or a permanent magnet (1) of a rotor (100), the rotor (100) including the rotor core (3) and the permanent magnet (1) that is bonded to the rotor core (3) with the adhesive (4) containing a foaming agent (41). The application device (201) includes: a pump (211) that feeds the adhesive (4); a nozzle (213) having a discharge port (213a) to discharge the adhesive (4) fed by the pump (211); and a moving mechanism unit (212) that moves the nozzle (213) relative to the application surface (11). Further, the application device (201) is configured to apply the adhesive (4) to an application area (R) on the application surface (11) while moving the nozzle (213) in a nozzle traveling direction that is a direction along the application surface (11) by using the moving mechanism unit (212), and the nozzle (213) is configured to spread the adhesive (4) to a portion (142) on a front side with respect to the application area (R) on the application surface (11), when the nozzle (213) moves to a front (arrow Y1 direction) side in the nozzle traveling direction with respect to a position (Pe) in the application area (R) at which discharge of the adhesive (4) is finished.

With this configuration, the application device (201) is capable of preventing non-uniformity in the thickness (t11) of the adhesive (4), while preventing an increase in the size of manufacturing equipment for the rotor (100).

Further, in the present embodiment, the nozzle (213) includes a spreading portion (213b) that is disposed adjacent to the discharge port (213a) and that spreads the adhesive (4). With this configuration, even when the residual adhesive (4) in the nozzle (213) comes out of the discharge port (213a), the residual adhesive (4) can easily be spread by the spreading portion (213b) adjacent to the discharge port (213a).

Further, in the present embodiment, the spreading portion (213b) includes a flat surface (213b) that is flush with the discharge port (213a). If the distance between the spreading portion and the application surface is different from the distance between the discharge port and the application surface, the adhesive discharged from the discharged port may be attached to (remain on) the one (spreading portion or discharge port) that is more distant from the application surface. In view of this, in the present embodiment, the spreading portion (213b) includes the flat surface (213b) that is flush with the discharge port (213a), and hence the adhesive (4) can be spread while preventing the adhesive (4) from remaining on the spreading portion (213b) or the discharge port (213a).

Further, in the present embodiment, two of the spreading portions (213b) are disposed adjacent to two sides of the discharge port (213a) in at least a direction (X direction) orthogonal to the nozzle traveling direction. With the provision of the spreading portions (213b) disposed adjacent to the two sides of the discharge port (213a) in the direction (X direction) orthogonal to the nozzle traveling direction, it is possible to spread the adhesive (4) (to cause the adhesive (4) to protrude) not only to the front side (arrow Y1 direction) in the nozzle traveling direction, but also to the direction (X direction) orthogonal to the nozzle traveling direction. As a result, the residua adhesive (4) in the nozzle (213) can be more reliably attached to the outside the application area (R).

In the present embodiment, the nozzle (213) includes an adhesive release portion (213c) that is disposed adjacent to the discharge port (213a) in the nozzle traveling direction, and a length (L13) of the adhesive release portion (213c) in the nozzle traveling direction is less than a length (L12) of the flat surface of the spreading portion (213b) in a direction orthogonal to the nozzle traveling direction. With this configuration, the adhesive release portion (213c) can prevent interference between the nozzle (213) and the applied adhesive (4) when changing the distance between the nozzle (213) and the application surface (11).

[Modifications]

The present embodiment is to be considered in all respects as illustrative and not restrictive.

For example, in the above embodiment, the rotor is configured as a so-called inner rotor that is disposed on the radially inner side of the stator. However, the present disclosure is not limited thereto. That is, the rotor may be configured as an outer rotor.

Further, in the above embodiment, the adhesive is applied to the permanent magnet. However, the present disclosure is not limited thereto. That is, the adhesive may be applied to the magnet hole.

Further, in the above embodiment, as illustrated in FIG. 8, the distance between the nozzle and the permanent magnet when forming the application start end and the distance when forming the application finish end are equal (d12 and d13 are equal). However, the present disclosure is not limited thereto. For example, d12 may be greater than d13, or d13 may be greater than d12.

Further, in the above embodiment, when forming the application start end and the application finish end, the distance (d12 and d13) between the nozzle and the permanent magnet is less than or equal to half the thickness of the adhesive. However, the present disclosure is not limited thereto. As long as the adhesive can be spread to a portion on the front side with respect to the application area, the distance between the nozzle and the permanent magnet can be greater than half the thickness of the adhesive.

Further, in the above embodiment, a method of manufacturing an interior permanent magnet (IPM) rotor in which a rotor core has magnet holes is illustrated. However, the present disclosure is not limited thereto. For example, a surface permanent magnet (SPM) rotor in which permanent magnets are bonded to the outer peripheral surface of a rotor core may be manufactured.

Further, in the above embodiment, the adhesive is applied to the surface 11 of the permanent magnet (see FIG. 4). However, the present disclosure is not limited thereto. For example, the adhesive may be disposed on the surface 12 of the permanent magnet, or may be disposed on each of the surface 11 and the surface 12.

Further, in the above embodiment, the length of the spreading portion in the X direction is less than or equal to half the length of the discharge port and greater than or equal to one-fifth the length of the discharge port in the X direction (long-side direction). However, the present disclosure is not limited thereto. For example, as long as the spreading portion has a length great enough to spread the adhesive, the length of the spreading portion in the X direction may be less than one-fifth the length of the discharge port in the X direction. Further, as long as the spreading portion does not interfere with other jigs, the length of the spreading portion in the X direction may be greater than or equal to half the length of the discharge port in the X direction.

Further, in the above embodiment, the adhesive is applied such that the adhesive is spread to a portion on the front side with respect to the application area on the surface of the permanent magnet, by moving the nozzle to the front side in the nozzle traveling direction with respect to the position in the application area at which discharge of the adhesive is finished, while reducing the distance between the nozzle and the surface of the permanent magnet to less than the application thickness of the applied adhesive. However, the present disclosure is not limited thereto. For example, the adhesive may be applied such that the adhesive is spread to the portion on the front side with respect to the application area on the surface of the permanent magnet, while maintaining the distance between the nozzle and the surface of the permanent magnet constant.

The invention claimed is:

1. A method of manufacturing a rotor including a rotor core and a permanent magnet that is bonded to the rotor core with an adhesive containing a foaming agent, the method comprising:
    applying the adhesive to an application area on an application surface of the permanent magnet or the rotor core, while moving a nozzle in a nozzle traveling direction that is a direction along the application surface, the nozzle having a discharge port to discharge the adhesive fed by a pump that feeds the adhesive;
    placing the permanent magnet on the rotor core, after applying the adhesive; and
    foaming and curing the adhesive after placing the permanent magnet,
    wherein applying the adhesive includes applying the adhesive such that the adhesive is spread to a portion on a front side with respect to the application area on the application surface, by moving the nozzle to a front side in the nozzle traveling direction with respect to a position in the application area at which feeding of the adhesive by the pump is finished.

2. The method of manufacturing according to claim 1, wherein applying the adhesive includes applying the adhesive, by moving the nozzle to a front side in the nozzle traveling direction with respect to a position in the application area at which discharge of the adhesive is finished, while reducing a distance between the nozzle and the application surface to less than a thickness of the applied adhesive in a direction orthogonal to the application surface.

3. The method of manufacturing according to claim 2, wherein applying the adhesive includes applying the adhesive, by moving the nozzle to the front side in the nozzle traveling direction with respect to the position in the application area at which discharge is finished, while reducing the distance between the nozzle and the application surface to less than or equal to half the thickness of the applied adhesive in the direction orthogonal to the application surface.

4. The method of manufacturing according to claim 3, wherein applying the adhesive includes applying the adhesive remaining in the nozzle to a portion on a rear side with respect to the application area on the application surface while a distance between the nozzle and the application surface is set to be less than a thickness of the adhesive to be applied in a direction orthogonal to the application surface, and thereafter applying the adhesive to the application area on the application surface while the distance between the nozzle and the application surface is set to be greater than or equal to the thickness of the adhesive to be applied.

5. The method of manufacturing according to claim 3, wherein:
    rotor core is provided with a magnet hole into which the permanent magnet is inserted; and
    applying the adhesive includes applying the adhesive such that a total length of a thickness of the adhesive and a length of the permanent magnet is less than a width of the magnet hole in a thickness direction of the adhesive.

6. The method of manufacturing according to claim 2, wherein applying the adhesive includes applying the adhesive remaining in the nozzle to a portion on a rear side with respect to the application area on the application surface while a distance between the nozzle and the application surface is set to be less than a thickness of the adhesive to be applied in a direction orthogonal to the application surface, and thereafter applying the adhesive to the application area on the application surface while the distance between the nozzle and the application surface is set to be greater than or equal to the thickness of the adhesive to be applied.

7. The method of manufacturing according to claim 2, wherein:
    the rotor core is provided with a magnet hole into which the permanent magnet is inserted; and
    applying the adhesive includes applying the adhesive such that a total length of a thickness of the adhesive and a length of the permanent magnet is less than a width of the magnet hole in a thickness direction of the adhesive.

8. The method of manufacturing according to claim 1, wherein applying the adhesive includes applying the adhesive remaining in the nozzle to a portion on a rear side with respect to the application area on the application surface while a distance between the nozzle and the application surface is set to be less than a thickness of the adhesive to be applied in a direction orthogonal to the application surface, and thereafter applying the adhesive to the application area on the application surface while the distance between the nozzle and the application surface is set to be greater than or equal to the thickness of the adhesive to be applied.

9. The method of manufacturing according to claim 8, wherein:
   the rotor core is provided with a magnet hole into which the permanent magnet is inserted; and
   applying the adhesive includes applying the adhesive such that a total length of a thickness of the adhesive and a length of the permanent magnet is less than a width of the magnet hole in a thickness direction of the adhesive.

10. The method of manufacturing according to claim 1, wherein applying the adhesive includes applying the adhesive to the application area on the application surface, while maintaining a discharge amount of the adhesive from the discharge port constant, and maintaining a moving speed of the nozzle in the nozzle traveling direction constant.

11. The method of manufacturing according to claim 1, wherein applying the adhesive includes applying the adhesive containing a volatile agent to the application surface of the permanent magnet such that the adhesive is spread to the portion on the front side with respect to the application area on the application surface, the method further comprising:
   the adhesive by volatilizing the volatile agent, after applying the adhesive and before placing the permanent magnet.

12. The method of manufacturing according to claim 1, wherein:
   the rotor core is provided with a magnet hole into which the permanent magnet is inserted; and
   applying the adhesive includes applying the adhesive such that a total length of a thickness of the adhesive and a length of the permanent magnet is less than a width of the magnet hole in a thickness direction of the adhesive.

* * * * *